Figure 12:
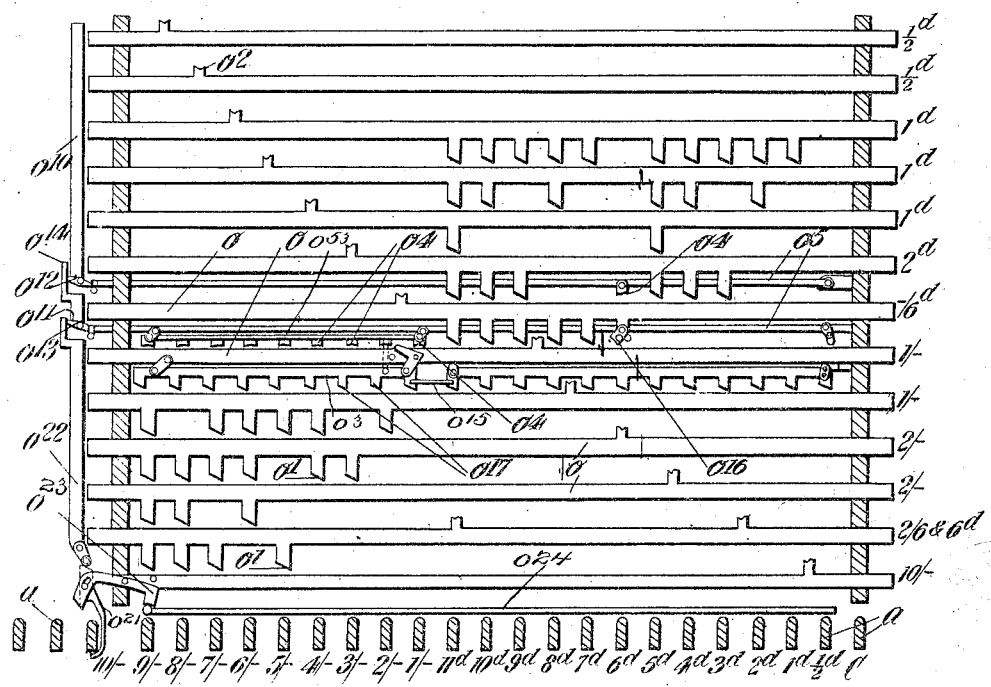

No. 850,842. PATENTED APR. 16, 1907.
K. MALMSTROM.
CASH RECEIVING AND CHANGE MAKING MACHINE.
APPLICATION FILED DEC. 24, 1906.
9 SHEETS—SHEET 1.
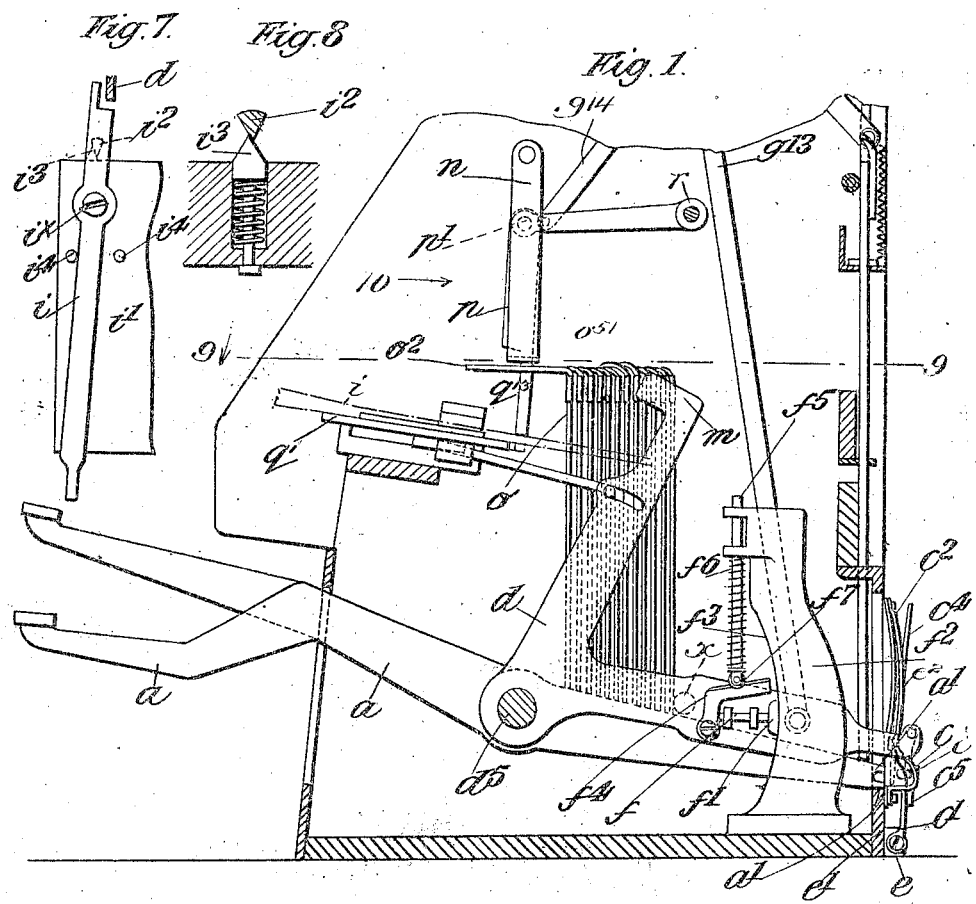

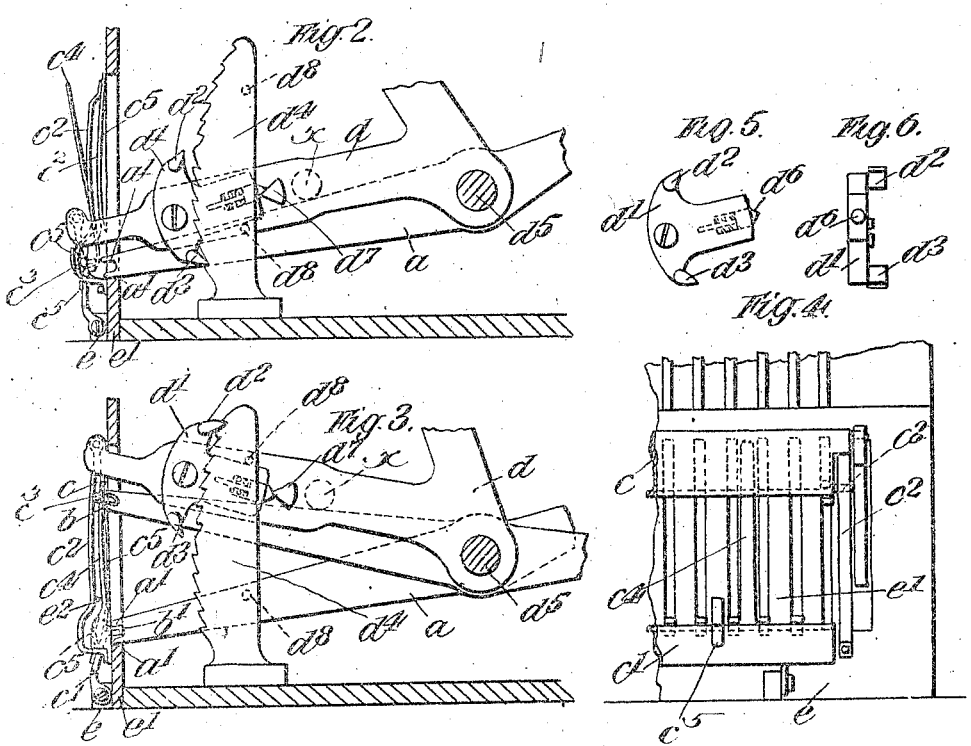

No. 850,842. PATENTED APR. 16, 1907.
K. MALMSTROM.
CASH RECEIVING AND CHANGE MAKING MACHINE.
APPLICATION FILED DEC. 24, 1906.
9 SHEETS—SHEET 3.
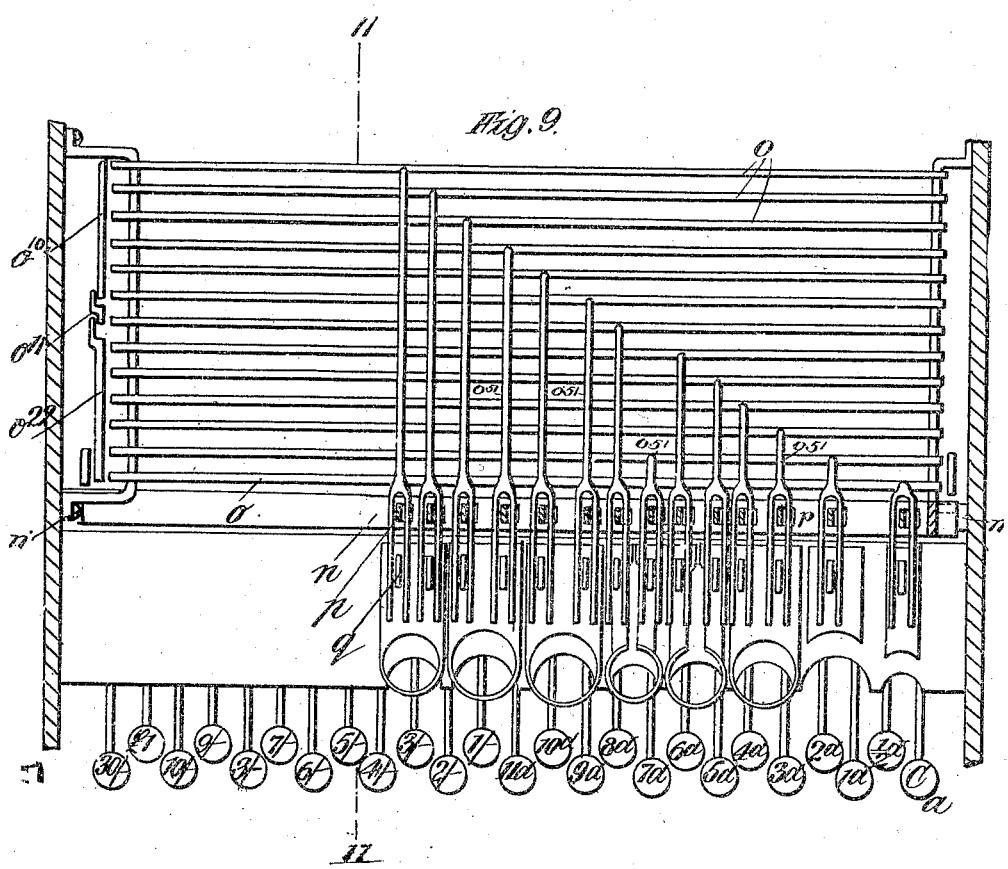

No. 850,842. PATENTED APR. 16, 1907.
K. MALMSTROM.
CASH RECEIVING AND CHANGE MAKING MACHINE.
APPLICATION FILED DEC. 24, 1906.
9 SHEETS—SHEET 4.
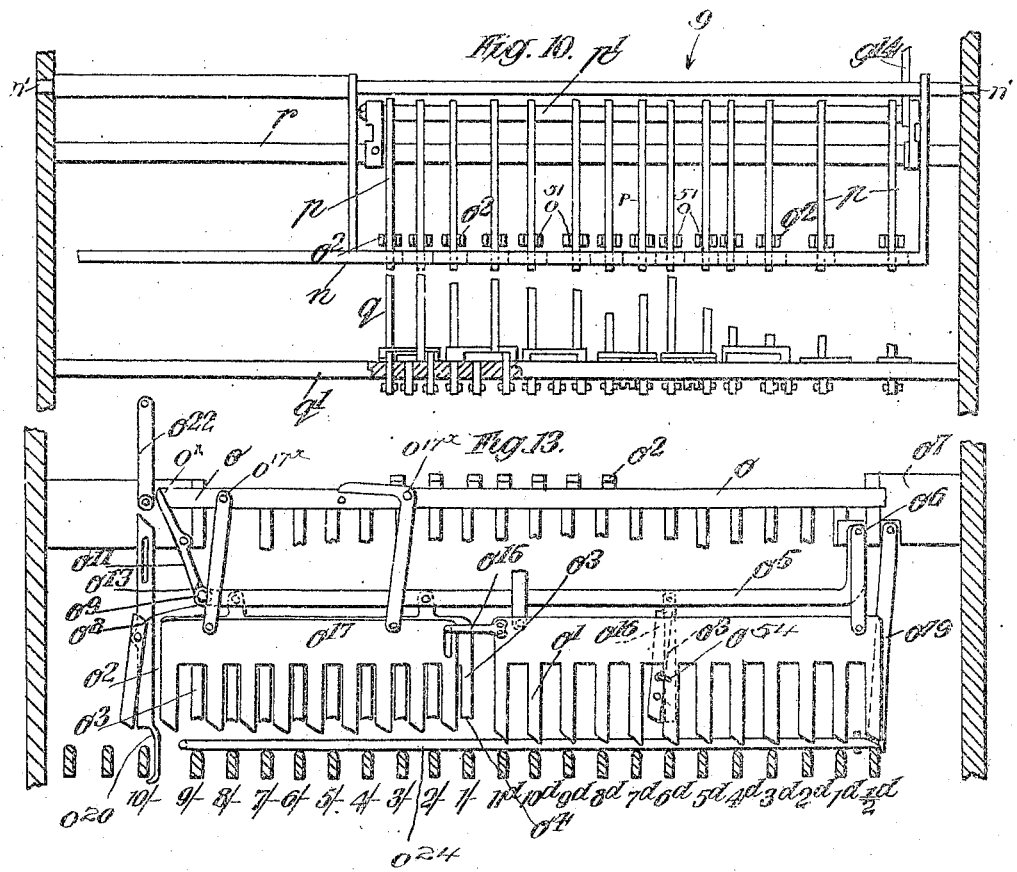

No. 850,842. PATENTED APR. 16, 1907.
K. MALMSTROM.
CASH RECEIVING AND CHANGE MAKING MACHINE.
APPLICATION FILED DEC. 24, 1906.
9 SHEETS—SHEET 5.
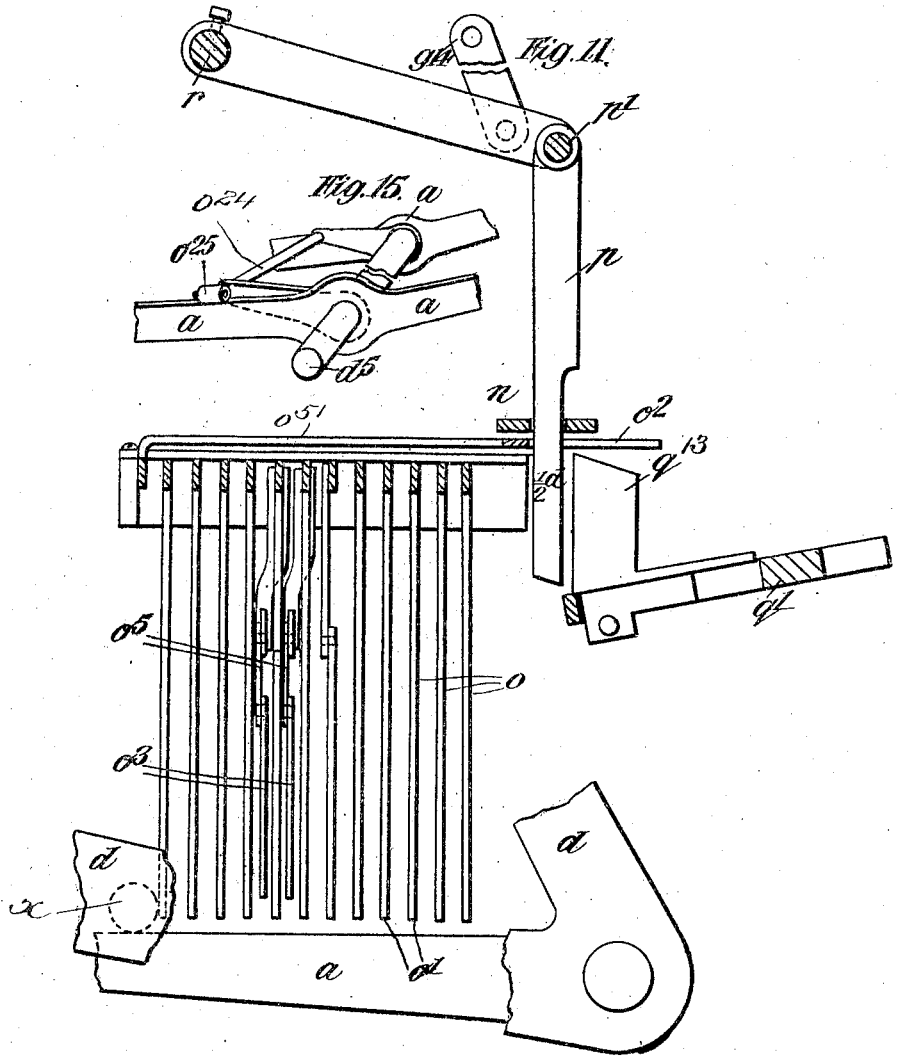
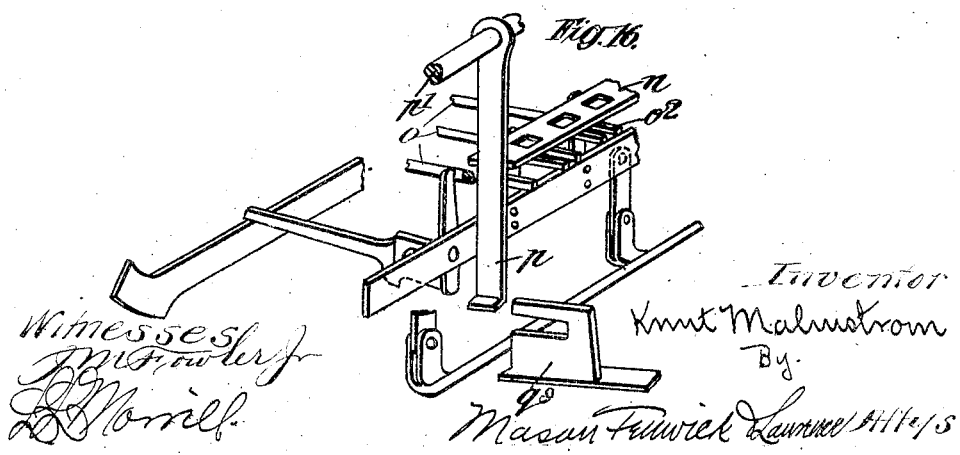

No. 850,842. PATENTED APR. 16, 1907.
K. MALMSTROM.
CASH RECEIVING AND CHANGE MAKING MACHINE.
APPLICATION FILED DEC. 24, 1906.
9 SHEETS—SHEET 7.
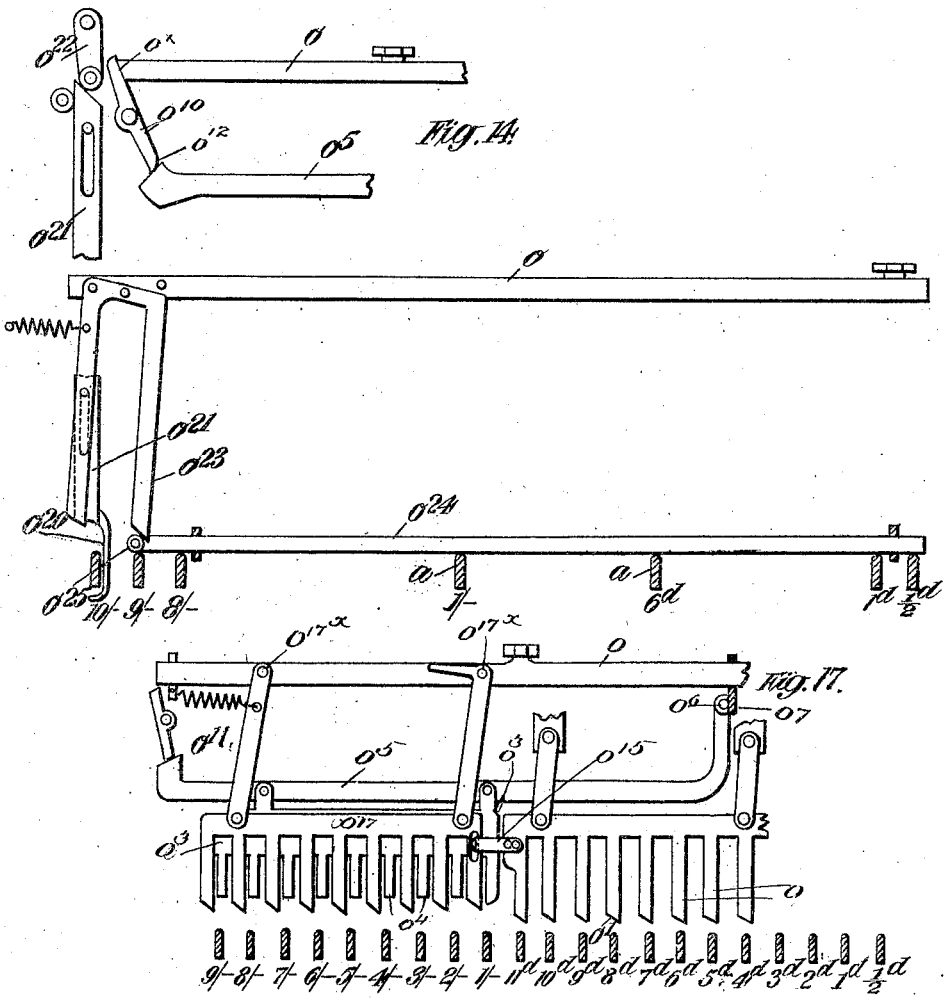
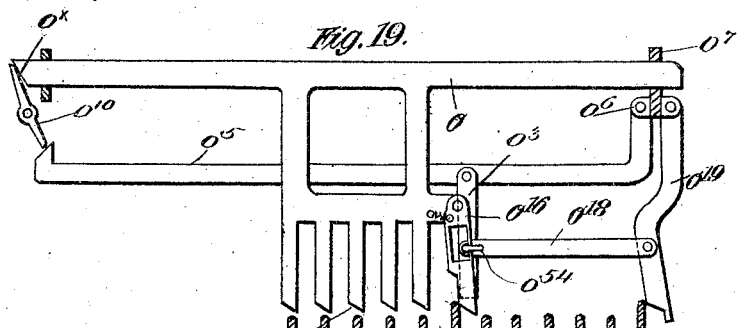

No. 850,842. PATENTED APR. 16, 1907.
K. MALMSTROM.
CASH RECEIVING AND CHANGE MAKING MACHINE.
APPLICATION FILED DEC. 24, 1906.
9 SHEETS—SHEET 8.
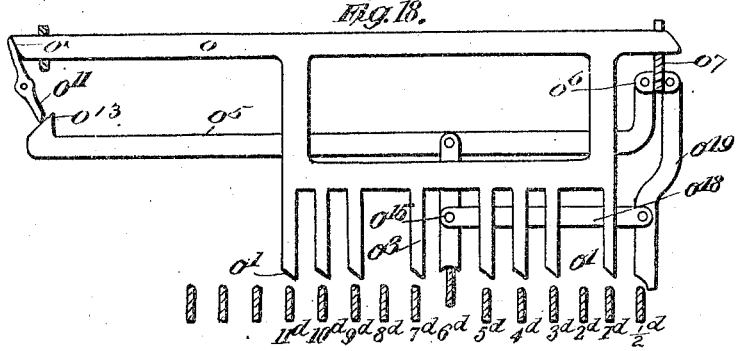
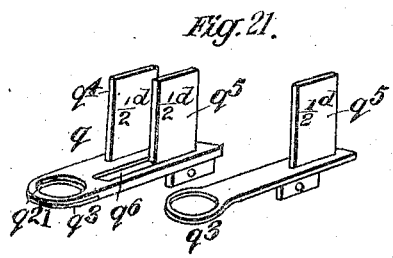
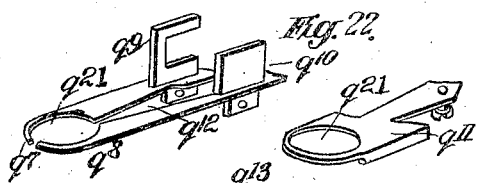
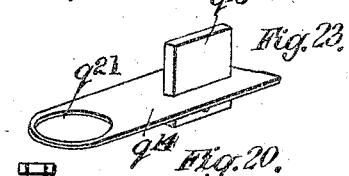
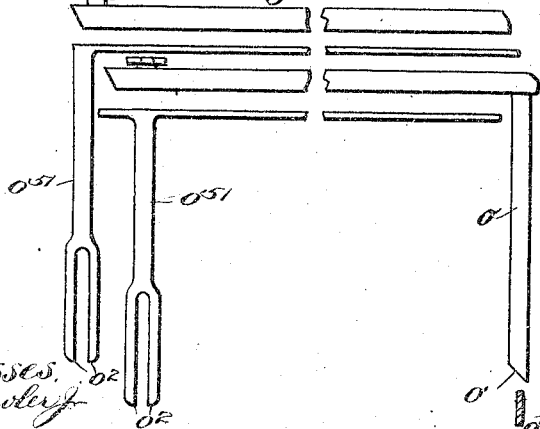
Inventor
Knut Malmstrom
By Mason Fenwick Lawrence
Attys

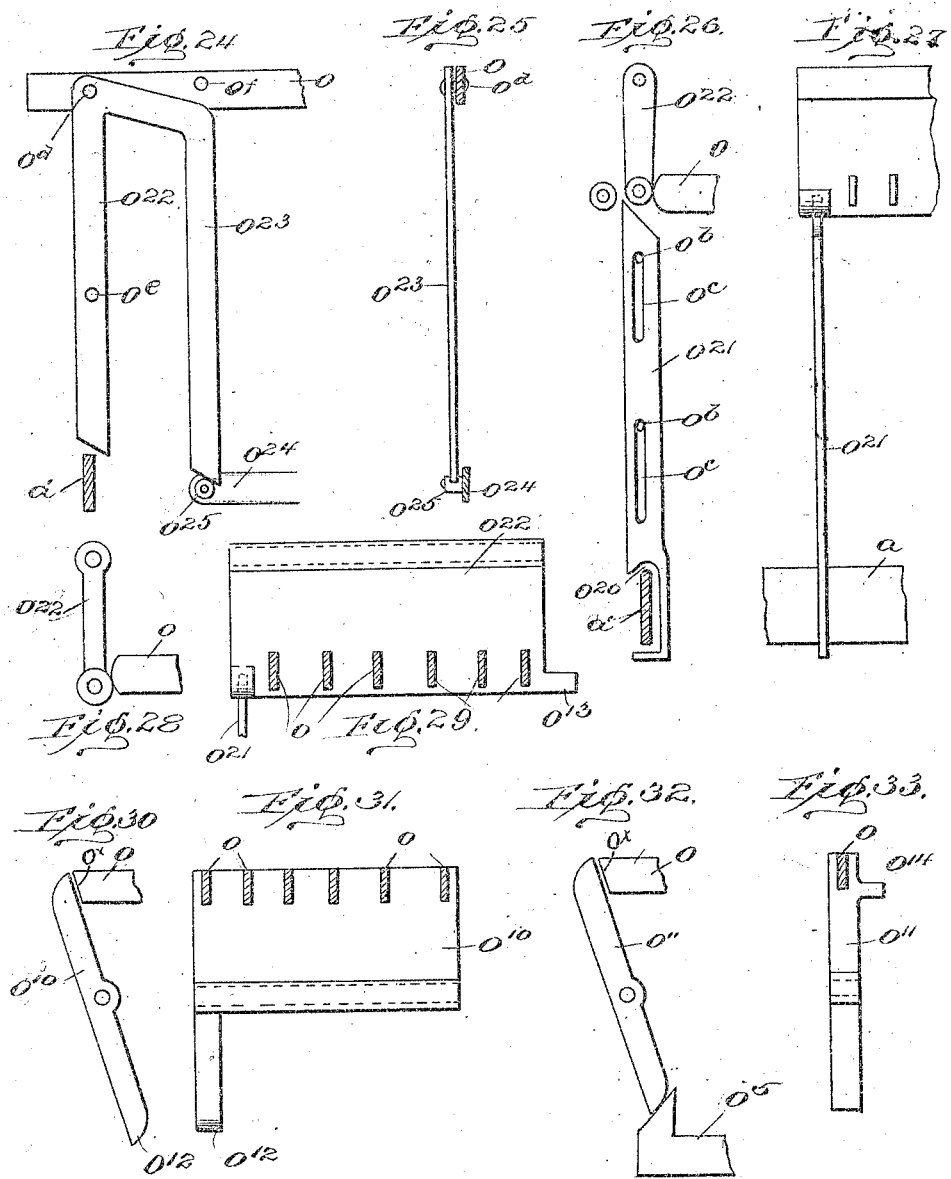

UNITED STATES PATENT OFFICE.

KNUT MALMSTROM, OF WEST KENSINGTON, LONDON, ENGLAND, ASSIGNOR TO THE F. S. M. SYNDICATE, LIMITED, OF LONDON, ENGLAND.

CASH-RECEIVING AND CHANGE-MAKING MACHINE.

No. 850,842.   Specification of Letters Patent.   Patented April 16, 1907.

Application filed December 24, 1906. Serial No. 349,204.

*To all whom it may concern:*

Be it known that I, KNUT MALMSTROM, a subject of the Czar of Russia, residing at 30 Porten House, Porten Road, West Kensington, in the county of London, England, engineer, have invented certain new and useful Improvements Relating to Cash-Receiving and Change-Making Machines, of which the following is a specification.

This invention relates to cash-receiving and change-making machines of the type described in the specification of British Letters Patent No. 16,577 of 1903, wherein the change or difference is delivered after deducting the amount of the sale or purchase from the amount or coin tendered in payment thereof and wherein a selective feeling-finger serves to set the mechanism for operation by the key-levers which are adapted to actuate a rocking frame that operates the selective mechanism pertaining to the coin-ejector, the objects of the present improvements being to render the machine more efficient and reliable in its action, to prevent the operation of the machine except when authorized, and to simplify the mechanism generally.

In working machines of the class herein referred to a certain amount of difficulty has been experienced in operating the key-levers so as to insure their full operation and to prevent retraction when only completely depressed or operated.

In order that the said invention may be clearly understood and readily carried into effect, we will proceed to describe the same with reference to the accompanying drawings, in which—

Figure 1 is a vertical section of a cash-receiving and change-making machine embodying the present invention, it being understood that all the mechanism pertaining to the machine is not included, but so much only as is necessary for the purpose of illustrating my improvements. Figs. 2 and 3 are detached views of the means for locking the key-levers and rocking frame, the former figure showing the parts in their normal or inoperative positions and the latter figure showing the parts in the positions they occupy upon the depression of one or more of the key-levers and the movement of the rocking frame. Fig. 4 is a fragmentary view of the rear of the machine corresponding with Fig. 3. Figs. 5 and 6 are detail views of the pivoted pawl-piece and spring-controlled catch or plunger. Fig. 7 is a plan of a fragment of the coin-plate provided with the pivoted catch whereby the levers and rocking frame are locked, Fig. 8 being a detail view of the spring-controlled pawl pertaining to the locking means. Fig. 9 is a plan, and Fig. 10 a front, view, of the change-actuating mechanism, the former figure showing the connections of the hanger-forks with their respective comb-bars and the latter figure showing the hangers and ejectors. Fig. 11 is a section taken along the line 11 11 in Fig. 9. Fig. 12 is a diagrammatic view illustrating the position of the key-levers relatively to the corresponding comb projections or cams, the levers being shown as arranged one above the other, while in use they are arranged side by side and the forked stem shown as directed upwardly, whereas in use they are directed toward the front and with the combs foreshortened. Fig. 13 is a view illustrating the construction of the combs and the comb projections or cams pertaining to the sixpenny silver and shillings and ten-shilling levers. Fig. 14 is a view of the ten-shilling L-lever, illustrating its action on the comb projection or cam when operated singly or in conjunction with other key-levers. Fig. 15 is a perspective view of the frame which operates the ten-shilling comb. Fig. 16 is a perspective view illustrating the arrangement for throwing the sixpenny ejector-fork out of alinement with the corresponding ejector upon the insertion of a half-crown in a separator (not shown, but such as is well known and described in British Patent No. 16,577/1903) and the depression of the two-shilling key-lever. Fig. 17 is a diagrammatic view of the shilling-ejector cam which comes into operation when any one of the shilling-levers is depressed with any one of the penny-levers. Fig. 18 is a similar view illustrating one of the penny-cams and the sixpenny-cam which comes into operation when the sixpenny-lever is depressed singly. Fig. 19 shows the sixpenny-cam when the sixpenny-lever is depressed along with the halfpenny-lever. Fig. 20 illustrates the two halfpenny-combs with the cams and the hanger-forks. Fig. 21 is a perspective view of the ejector employed in connection with the halfpenny and the two-shilling coins, the two ejectors being shown together and the second ejector being also shown detached. Fig. 22 illustrates the construction of the ejector employed in connection with the sixpence and shilling coins, Fig. 23 illustrating the form of ejector employed in connection with the half-crown and ten-shilling coins. Fig. 24 is a detail view, in side elevation, of one of the cam-rocking pieces. Fig. 25 is a view in edge elevation of the cam-rocking piece shown at Fig. 24. Fig. 26 is a view in side elevation of one of the slotted cam-pieces and one of the rocking plates actuated thereby. Fig. 27 is a view in edge elevation of the slotted piece shown at Fig. 26. Fig. 28 is a view in end elevation of one of the rocking plates adapted to move the comb-bars. Fig. 29 is a view in side elevation of the rocking plate shown in end elevation at Fig. 28. Fig. 30 is a view in end elevation of another one of the rocking plates adapted to move the comb-bars. Fig. 31 is a view in side elevation of the rocking plate shown at Fig. 30. Fig. 32 is a view in edge elevation of one of the rocking levers adapted to move one of the comb-bars. Fig. 33 is a view in side elevation of the rocking lever shown at Fig. 32.

According to this invention the machine is provided with means whereby upon commencing the depression of two, three, or more key-levers of different denominations their locking is effected, so that by continuing to depress one of the said levers the two, three, or more of the latter so locked and partially depressed will be carried down, the machine also being provided with means whereby the whole of the levers other than those in course of being depressed or operated are locked or held against depression or operation. In this connection the inner extremity of each key-lever $a$ is notched or formed with two horns $a'$ $a'$, adapted to engage inwardly-projecting ribs $b$ $b'$, formed on the adjacent edges of two plates, whereof one, $c$, is hung from the end of the rocking frame $d$, and the other, $c'$, is pivoted in the frame $e$ of the machine. Upon the slotted back plate $e'$, through which the rear ends of the rocking frame $d$ and the several key-levers $a$ pass, is mounted a guide-bar $c^2$, between which and the aforesaid slotted plate $e'$ are placed projections or pins $c^3$, Figs. 1, 2, 3, and 4, arranged laterally on the pendent or hanging plate $c$. The pivoted plate $c'$ is controlled by tailpieces $c^4$, against which the pendent plate $c$ works in its upward and downward movements. The aforesaid slotted back plate $e'$, or an attachment thereon, and the guide-bar $c^2$ are arranged in such a manner as to constitute a cam-slot $e^2$. Upon the depression of a lever or of two or more levers $a$ the rocking frame $d$ is simultaneously actuated by means of the rod or bar $x$ bearing thereon, and the upper or pendent plate $c$ carried thereby is caused to rise. The lateral projections or pins $c^3$ within the cam-slot $e^2$ (after the pendent plate has commenced to rise) effect the inward movement of the pendent plate and by operating against tailpieces $c^4$, carried on the inner side of the pivoted plate $c'$, cause the inwardly-projecting rib $b'$ on the latter to enter the notch or between the horns $a'$ of all the other key-levers, thereby locking or holding the same against depression or operation. The rib of the pendent plate $c$, however, owing to the cam-slot $e^2$, is held in engagement with the levers $a$ which were primarily depressed, and by continuing to operate or depress one of such levers the two, three, or other number thereof are depressed to their full extent. When the operated lever or levers $a$ returns or return to its or their normal position, the lateral projections or pins $c^3$ on the pendent plate $c$ within the cam-slot $e^2$ cause the said plate to be moved outwardly, a similar movement of the pivoted plate $c'$ also taking place as the result of the pendent plate $c$ acting against a tailpiece $c^5$, Figs. 2, 3, and 4, carried on the outer side of the pivoted plate $c'$, whereupon the several levers $a$ are unlocked and ready for being subsequently operated. By thus locking the key-levers which are required to be operated in accordance with the amount of the sale or purchase the depression of one of the said levers effects the depression of the others, and by locking all the remaining key-levers (those not required for immediate operation) their depression is effectually prevented. The machine is hereby rendered more certain and reliable in its action and more easily operated.

In order to prevent the return of the rocking frame $d$ until a complete stroke or depression of the key-lever $a$ has been made, the said rocking frame $d$ is provided with a pivoted piece $d'$, formed or provided with two lateral projections or pawls $d^2$ $d^3$, adapted to engage teeth formed on a quadrantal bar or rack $d^4$, whereof the arc is struck from the center of the pivot $d^5$ of the rocking frame $d$, the said bar or rack $d^4$ being fixed in or to the framework of the machine. The distance between the projections or pawls $d^2$ $d^3$ on the pivoted piece $d'$ is equivalent to the length of movement of the rocking frame $d$ at the point where the pivoted piece is situated. The quadrantal rack $d^4$ is preferably about double the length of stroke required of the pivoted piece, each half of the rack being provided with teeth oppositely arranged, (see Figs. 2 and 3,) the teeth in the one half being adapted for engagement with the projection $d^3$ on the pivoted piece $d'$ on the upstroke of the frame $d$, while the other half is adapted for engagement with the projection $d^2$ on the pivoted piece on the return movement of the said frame. The said pivoted piece $d'$ is provided with a spring-controlled catch or plunger $d^6$, adapted to pass and be engaged upon opposite sides of a knife-edge or V-shaped stud $d^7$, carried by the rocking frame $d$. Upon the depression of a key-lever $a$ and the consequent operation of the rocking frame $d$ the V-shaped stud $d^7$ is engaged by the catch $d^6$, and owing to the engagement of one, $d^3$, of the projections on the pivoted piece $d'$ with the teeth in the lower part of the rack $d^4$ the rocking frame $d$ is prevented from being returned. The quadrantal bar or rack $d^4$ is provided with lateral projections or pins $d^8$, so that upon the accomplishment of the full stroke the pivoted piece $d'$ is moved pivotally to engage the opposite side of the stud $d^7$ and, on the one hand, to allow the free downward movement of the inner end of the rocking frame $d$, and, on the other hand, to allow the engagement of one of the projections or pawls thereon with the rack, and thereby prevent the retracting of the rocking frame. The action of the rocking frame and the key-lever being thus locked together are thereby rendered positive, and once commenced the operation must be carried through.

For regulating the stroke of the key-levers and equalizing the pressure thereon a braking device is provided (see Fig. 1) comprising a plunger $f$, mounted in guides on the side of the rocking frame and provided with a friction-head $f'$, adapted to bear against a standard $f^2$, having a curved friction-surface $f^3$, whereof the arc is struck from the center of the pivot $d^5$ of the rocking frame $d$. The end of the plunger remote from the head bears against one arm of a pivoted L-shaped lever $f^4$, the free end of the latter being subjected to pressure by a rod $f^5$, which is controlled by a spring $f^6$. The rod $f^5$ carries a roller $f^7$ in engagement with lever $f^4$, and whereby friction is diminished. Upon the depression of one of the key-levers $a$ and the consequent operation of the rocking frame $d$ the plunger $f$ is moved in frictional engagement along the surface $f^3$, and as the depression of the lever proceeds the resistance offered by the spring-controlled plunger $f^5$ increases. Thus the pressure necessary for operating the key-levers is equalized during the entire stroke. An even movement of the key-levers is secured by this arrangement, the spring $f^6$ counteracting the pressure exerted by the operator on the key-levers.

The machine may be provided with a pivoted catch $i$, Figs. 7 and 8, suitably arranged in relation to the rocking frame $d$, so that the latter may be locked and therewith the key-levers $a$. Thus the key-levers and the rocking frame may be rendered incapable of operation when the catch $i$ is actuated as by a key, the locking-catch $i$ being preferably arranged in the interior of the machine. The device comprises a lever $i$, pivoted at $i^x$ on the coin-plate $i'$ and having a V or wedge shaped stud $i^2$, adapted to be engaged by a spring-controlled pawl $i^3$, carried by the said coin-plate $i'$, the movement of the lever being limited by suitably-positioned stops $i^4$ $i^4$.

The change system comprises the key-levers $a$, arranged so as to actuate the rocking frame $d$, whereon are arms $m$, adapted to operate a transverse frame $n$, pivoted at $n'$, the said levers also actuating comb-bars $o$, mounted to slide longitudinally from left to right and provided with beveled extremities $o'$, abutting the key-levers, such as already proposed for use in machines of the kind to which the present invention relate, and adapted to move the levers $p$ corresponding to the key-levers out of alinement, so that the corresponding coins are not ejected which correspond with the value of the key-levers which may be depressed. The comb-bars $o$ are arranged in proximity to pendent pivotally-mounted levers or hangers $p$, the latter depending from and loosely mounted on the bar $p'$ through slots in the frame $n$ and between forked projections $o^2$ on the bars $o^{51}$, carried by the bars $o$ normally in line with coin-ejectors $q$, working on the coin-plate $q'$. Some of the pendent levers $p$ are adapted to be moved laterally by the corresponding arms $o^2$ out of alinement with the projections $q$, and when all of the pendent levers $p$ are moved by the frame $n$ only such as are not laterally moved and are still in alinement engage the projections $q$ and actuate the corresponding ejectors. In addition to the comb-bars $o$, having cam-shaped or beveled extremities $o'$, there are arranged combs $O^3$, Figs. 12 and 13, having curved or flat-ended teeth $o^4$—that is to say, teeth not provided with beveled extremities. The combs $o^3$ are pivoted on L-shaped levers $o^5$, so that the curved or flat teeth $o^4$ of the combs rest over their respective key-levers $a$. The L-shaped levers $o^5$ are pivoted at one end at $o^6$ to the support $o^7$ and their other ends supported by the keys. There are two L-shaped levers $o^5$, with their respective combs $o^3$ and $o^{53}$, the latter of which is intended to be elevated or operated by the sixpenny-lever only and the former to be elevated or operated by the several levers pertaining to the shillings. Thus the combs having beveled extremities operate the comb-bars $o'$, while those having curved or flat-ended teeth operate the L-shaped levers $o^5$ when the sixpence key-lever is depressed.

The end $o^8$ of each L-shaped lever is provided with a roller $o^9$. Above the rollers two rocking pieces $o^{10}$ and $o^{11}$ are pivoted to the frame of the machine, the said rocking pieces having beveled tailpieces $o^{12}$ and $o^{13}$, respectively, facing each roller $o^9$, the other portion of each rocking piece $o^{10}$ and $o^{11}$ being arranged to engage the beveled ends $o^x$ of the comb-bars $o$. The sixpenny rocking piece $o^{10}$ is positioned to engage all the penny-bars $o$, and when the said rocking piece $o^{10}$ is operated as the result of depressing the sixpenny-lever the combs pertaining to the copper pendent levers $p$ are thrown out of alinement with their ejectors, so that the ejectors pertaining thereto are not operated. The rocking piece $o^{11}$ for the shilling-levers engages the sixpenny-silver beveled comb-bar $o$, which bar when in operation actuates the sixpenny-silver pendent lever $p$, said rocking piece $o^{11}$ having a lateral projection $o^{14}$ extending over the sixpenny-copper rocking piece $o^{10}$, so that when the shilling rocking piece $o^{11}$ is operated it also imparts similar movement to the sixpenny-copper rocking piece $o^{10}$, so that as the result of depressing the shilling key-lever the ejectors pertaining to the copper and the sixpence are not operated.

When the sixpenny-lever $a$ is operated singly, Figs. 18 and 19, the rear part of the said lever by elevating the sixpenny L-shaped lever $o^5$ will cause the sixpenny-copper rocking piece $o^{10}$ to engage and longitudinally move all the bars $o$ and the bars $o^{51}$, and therewith move the sixpenny-copper pendent levers $p$ out of alinement with the respective coin-ejectors $q$, the coins in front of these ejectors being then not subjected to ejection.

When one of the shillings key-levers is operated, the rear part of the lever by elevating the shilling L-shaped lever $o^5$, Fig. 17, will cause the sixpenny-silver rocking piece $o^{11}$ to engage and move the bars $o$ and the bars $o^{51}$ and move the sixpenny-silver pendent lever $p$ out of alinement with the sixpenny-silver ejector $q$, and the projection $o^{14}$, Fig. 12, on the rocking piece $o^{11}$, operating on the sixpenny-copper rocking piece $o^{10}$, will cause a similar movement of the pendent levers $p$ for the copper ejectors, the coins in front of those ejectors remaining in the machine.

The combs $o^3$ on the L-shaped levers $o^5$ are respectively connected by hooks $o^{15}$ to spring-retained bevel swinging cams $o^{16}$, Fig. 19, which are pivoted to their respective comb-bars $o$ and placed with their bevels similarly to the bevels on the said comb-bars, the sixpenny bevel swinging cam $o^{16}$ being pivoted to the sixpenny-silver comb-bar $o$ and the shilling bevel swinging cam $o^{17}$ being pivoted at $o^{17\times}$ to the shilling-silver comb-bar $o$, Figs. 13 and 17. The sixpenny-comb $o^3$ is connected by a link $o^{18}$, Fig. 19, carrying the connecting-hook $o^{54}$, to a spring-retained bevel-comb $o^{19}$, pivoted to the frame $o^7$ of the machine, so as to normally register with the halfpenny-lever $a$. When the said halfpenny-lever is depressed, the rear part thereof will engage the bevel of and impart a lateral movement to the bevel-comb $o^{19}$, a similar movement being transmitted through the link $o^{18}$ to the comb $o^3$ on the L-shaped piece $o^5$ and causing the said comb to be moved out of alinement with the sixpenny-lever $a$. The hook $o^{15}$ on the link $o^{18}$ engaging the bevel swinging cam $o^{16}$ on the sixpenny comb-bar $o$ will bring the hook-connected bevel-cam $o^{16}$ into position over the sixpenny-lever $a$, so that when the sixpenny-lever and the halfpenny-lever are simultaneously depressed the swinging comb $o^3$ will be thrown out of and the bevel swinging cam $o^{16}$ will be brought into the path of the sixpenny-lever $a$. The sixpenny-silver pendent lever $a$ will then be out of alinement with the sixpenny-ejector $q$, and the halfpenny pendent lever will also be out of alinement with the halfpenny-ejector. Consequently those coins will remain in the machine. When any one of the penny-levers is operated in conjunction with any one of the shilling-levers, the operation of the change mechanism is similar to the operation above described, in which the halfpenny-lever is operated in conjunction with the sixpenny-lever.

The ten-shilling lever $a'$ when operated singly acts on the flat or curved end $o^{20}$, Fig. 14, of a slotted piece $o^{21}$, which is capable of both a longitudinal and a swinging movement and is adapted to be moved by the rocking piece $o^{22}$, which is normally in alinement with the sixpenny-silver rocking piece $o^{11}$ and the sixpenny-copper rocking piece $o^{10}$ and also all the shilling comb-bars, with the exception of the ten-shilling comb-bar, causing all pendent levers representing ten shillings in silver and copper to be thrown out of alinement with their coin-ejectors. Consequently those coins are not ejected, but remain in the machine.

The bar $o^{24}$ when operated upon by any lever other than the ten-shilling lever will place the beveled swinging piece or cam $o^{23}$ on the ten-shilling comb-bar $o$ in position to be operated upon by the ten-shilling lever. The bar $o^{24}$ is so arranged as to act upon the said rocking piece $o^{23}$ and by resting on all the other levers to be elevated when said levers are operated. The bar $o^{24}$ is furnished with a roller $o^{25}$ for engaging with the cam end of rocking piece $o^{23}$. The bar $o^{24}$ when operated upon by any lever will move the bevel swinging cam $o^{23}$ above and in the path of the ten-shilling comb-bar $o$ and in position to be operated upon by the said ten-shilling lever. The ten-shilling pendent lever $p$ will then, upon the depression of the ten-shilling key-lever in conjunction with any of the other key-levers, be thrown out of alinement with the ten-shilling-gold ejector, and the pendent levers $p$, corresponding with the operated shillings and copper levers, will be similarly affected, thus permitting coins corresponding with the amount on the levers depressed to remain in the machine.

Referring to Fig. 21, the halfpenny-ejector $q$ comprises two plates $q^2$ $q^3$, provided, respectively, with lugs $q^4$ $q^5$, the latter lug, $q^5$, projecting from the plate $q^3$ through a slot $q^6$ in the plate $q^2$. When the machine is operated so as to necessitate the ejection of two halfpenny-coins, both ejectors are actuated by their respective lugs; but when one halfpenny-coin is to be ejected only the lug $q^5$ pertaining to the plate $q^3$ is actuated. Referring to Fig. 22, the ejector for the sixpenny (silver) and the one-shilling coins comprises two ejector plates or slides $q^7$ $q^8$, carrying lugs $q^9$ $q^{10}$, respectively, so that upon the operation of the machine either of the said plates may be actuated for ejecting one coin. For the purpose of ejecting two of the aforesaid coins the plate $q^{11}$ is arranged in an opening $q^{12}$ between the plate $q^7$ $q^8$, so that upon the operation of the one or the other of the lugs $q^9$ $q^{10}$ the plate $q^{11}$ will be turned laterally and not subjected to a forward movement; but when both lugs $q^9$ $q^{10}$ are actuated simultaneously the plate $q^{11}$ will be engaged by both plates $q^7$ $q^8$ and the coins held in the apertures $q^{21}$ of the respective plates ejected from the machine. Referring to Fig. 23, the ejector here shown is for use in ejecting a single coin, and its construction will be readily understood, the lug $q^{13}$ being carried by a plate or slide $q^{14}$, formed with an aperture $q^{21}$ for the reception of the coin.

What I claim, and desire to secure by Letters Patent of the United States, is—

1. The combination of a frame, key-levers fulcrumed upon the frame, a rocking frame actuated by the key-levers, a money-handling mechanism operated by the key-levers and rocking frame, a loosely-mounted plate carried by the rocking frame and adapted to engage the depressed key-levers to cause the same to operate in unison, a plate loosely connected to the frame and adapted to engage the undepressed key-levers to lock the same in a normal position, a tailpiece carried by one plate and engaging the opposite plate to cause the two plates to operate in unison, and a cam for operating one of the plates.

2. The combination of a frame, key-levers fulcrumed upon the frame, a rocking frame actuated by the key-levers, a money-handling mechanism operated by the key-levers and rocking frame, a pivoted plate carried by the rocking frame and adapted to engage the depressed key-levers to cause the same to operate in unison, guide-pins projecting from the plate, a guide mounted upon the frame and engaging the guide-pins to operate the plate, a second plate loosely connected to the frame and adapted to engage the undepressed key-levers to lock the same in position, and a tailpiece carried by the second-mentioned plate and engaging the first-mentioned plate to cause the two plates to operate in unison.

3. The combination of a frame, key-levers fulcrumed upon the frame, a rocking frame actuated by the key-levers, a money-handling mechanism operated by the key-levers and rocking frame, a locking-lever pivoted to the main frame and adapted to engage the rocking frame to prevent operation of the same, and a spring-controlled pawl carried by the main frame and engaging the locking-lever to hold the same against displacement.

4. The combination of a main frame, key-levers fulcrumed upon the frame, a rocking frame actuated by the key-levers, a money-handling mechanism operated by the key-levers and rocking frame, a standard carried by the main frame, and a spring-controlled pusher carried by the rocking frame and frictionally engaging the standard.

5. The combination of a main frame, key-levers fulcrumed upon the frame, a rocking frame actuated by the key-levers, a money-handling mechanism operated by the key-levers and rocking frame, a standard carried by the main frame, an L-shaped piece pivotally mounted upon the rocking frame, a pusher carried by the rocking frame and engaging the said L-shaped piece whereby it is brought into frictional engagement with the standard, and means whereby the L-shaped piece forces the pusher into a yielding engagement with the standard.

6. The combination of a main frame, key-levers fulcrumed upon the frame, a rocking frame actuated by the key-levers, a money-handling mechanism operated by the key-levers and the rocking frame, a standard carried by the main frame, an L-shaped piece pivoted upon the rocking frame, a pusher carried by the rocking frame and engaging the L-shaped piece whereby it is forced into a frictional engagement with the standard, and a spring-actuated rod carried by the standard and engaging the L-shaped piece.

7. The combination of a main frame, key-levers fulcrumed upon the main frame, a rocking frame actuated by the key-levers, a coin-ejecting mechanism operated by the rocking frame, slidably-mounted bars mounted upon the frame and provided with means whereby they can be actuated by the key-levers, means carried by the slidably-mounted bars for controlling the ejection of coins, an L-shaped lever pivoted to the frame, means carried by the L-shaped lever for engaging the key-levers, and a rocking piece operated by the L-shaped lever and adapted to actuate the slidably-mounted bar.

8. The combination of a main frame, key-levers fulcrumed upon the frame, a rocking frame actuated by the key-levers, coin-ejecting mechanism operated by the rocking frame, comb-like bars slidably mounted upon the main frame and designed to be actuated by the key-levers, means carried by the comb-like bars for controlling the ejection of coins, an L-shaped lever pivoted to the frame, a comb carried by the L-shaped lever for engaging the key-levers, and a rocking piece operated by the L-shaped lever and designed to actuate the before-mentioned comb-like bars.

9. The combination of a main frame, key-levers fulcrumed upon the main frame, a rocking frame actuated by the key-levers, coin-ejecting mechanism operated by the rocking frame, sliding bars mounted upon the main frame and provided with means whereby they are actuated by the key-levers, means carried by the sliding bars for controlling the ejection of coins, L-shaped levers pivoted to the frame, means carried by the L-shaped levers for engaging the key-levers, a rocking piece operated by each of the L-shaped levers, each of said rocking pieces being designed to operate a portion of the sliding bars, and means carried by one of the rocking pieces for simultaneously actuating the opposite rocking piece.

10. The combination of a frame, key-levers fulcrumed upon the frame, a rocking frame actuated by the key-levers, a coin-ejecting mechanism operated by the rocking frame, a series of comb-like bars slidably mounted upon the main frame and designed to be actuated by the key-levers, means carried by the comb-like bars for controlling the ejection of coins, L-shaped levers pivoted to the main frame, combs carried by the L-shaped levers for engaging the key-levers, a rocking piece for each of the L-shaped levers, the said rocking pieces being operated by the L-shaped levers and each being designed to actuate a portion of the comb-like bars, and means carried by one of the rocking pieces for engaging the opposite rocking piece whereby the two are caused to operate in unison.

In testimony whereof I affix my signature in presence of two witnesses.

KNUT MALMSTROM.

Witnesses:
WM. MELLERSH-JACKSON,
F. J. RAPSON.